(12) United States Patent
Zhou (10) Patent No.: US 9,486,934 B2
(45) Date of Patent: Nov. 8, 2016

(54) ACCESSORY CLAMPING MECHANISM AND POWER TOOL HAVING THE SAME

(71) Applicant: Chervon (HK) Limited, Wanchai (HK)

(72) Inventor: Hongtao Zhou, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 636 days.

(21) Appl. No.: 13/959,069

(22) Filed: Aug. 5, 2013

(65) Prior Publication Data
US 2014/0144662 A1   May 29, 2014

(30) Foreign Application Priority Data

Nov. 23, 2012   (CN) .......................... 2012 1 0479970
Nov. 23, 2012   (CN) .......................... 2012 1 0483495
Nov. 23, 2012   (CN) .......................... 2012 1 0483883
Nov. 23, 2012   (CN) .......................... 2012 1 0484176

(51) Int. Cl.
  B24B 23/04   (2006.01)
  B27B 19/00   (2006.01)
  B27B 5/32    (2006.01)
  B23Q 3/14    (2006.01)
  (Continued)

(52) U.S. Cl.
  CPC ............. B27B 19/006 (2013.01); B23Q 3/14 (2013.01); B24B 23/04 (2013.01); B24B 45/006 (2013.01); B25F 5/00 (2013.01); B27B 5/32 (2013.01); B24B 23/022 (2013.01); Y10T 279/33 (2015.01)

(58) Field of Classification Search
  CPC ..... B24B 23/02; B24B 23/022; B24B 23/04; B24B 27/08; B24B 41/04; B24B 45/006; B24B 55/10; B27B 5/32; B27B 19/006

USPC .................. 173/29, 128, 104, 213, 217, 49; 451/342, 344, 356, 359; 279/106, 141, 279/904
See application file for complete search history.

(56) References Cited

U.S. PATENT DOCUMENTS 4,989,374 A * 2/1991 Rudolf ................. B24B 23/022
                                              451/342
5,157,873 A * 10/1992 Rudolf ................. B24B 23/022
                                              279/904
(Continued)

FOREIGN PATENT DOCUMENTS

| CN | 103182704 | 3/2013 |
| GB | 2486393 | 6/2012 |
| GB | 2491032 | 11/2012 |

OTHER PUBLICATIONS

Intellectual Property Office, Examination Report under Section 18(3) re GB application No. 1314078.5, dated Mar. 18, 2016, 3 pgs.

*Primary Examiner* — Scott A. Smith
(74) *Attorney, Agent, or Firm* — Greenberg Traurig, LLP (57) ABSTRACT

An accessory clamping mechanism for clamping an accessory to a working mandrel having a mandrel flange. The accessory clamping mechanism includes: a fastening flange; a driving device for forcing the fastening flange to move between a released position in which the accessory can be removed between the mandrel flange and the fastening flange and a clamped position in which the accessory is clamped between the mandrel flange and the fastening flange; a pushing member connected to the fastening flange; and a first elastic member by which the fastening flange is biased towards the clamped position; wherein the pushing member is arranged on one side of the working mandrel.

12 Claims, 9 Drawing Sheets

(51) Int. Cl.
   *B24B 45/00*     (2006.01)
   *B25F 5/00*      (2006.01)
   *B24B 23/02*     (2006.01)

(56) References Cited

U.S. PATENT DOCUMENTS

| | | | | |
|---|---|---|---|---|
| 5,263,283 A * | 11/1993 | Rudolf | ............ | B25F 3/00 451/342 |
| 5,601,483 A * | 2/1997 | Rudolf | ............ | B24B 23/022 451/342 |
| 6,569,001 B2 * | 5/2003 | Rudolf | ............ | B24B 45/006 451/344 |
| 6,732,612 B2 * | 5/2004 | Adachi | ............ | B25B 13/48 81/13 |
| 8,182,316 B2 * | 5/2012 | Peisert | ............ | B23Q 5/027 30/388 |
| 8,925,931 B2 * | 1/2015 | Sergyeyenko | ............ | B24B 23/04 279/141 |
| 8,960,688 B2 * | 2/2015 | Zhou | ............ | B23D 61/006 279/141 |
| 9,061,410 B2 * | 6/2015 | Zhou | ............ | B25F 5/00 |
| 9,174,354 B2 * | 11/2015 | Zhou | ............ | B27B 5/32 |
| 2008/0190259 A1 * | 8/2008 | Bohne | ............ | B24B 23/04 83/666 |
| 2009/0023371 A1 * | 1/2009 | Blickle | ............ | B24B 45/006 451/359 |
| 2009/0197514 A1 * | 8/2009 | Peisert | ............ | B23Q 5/027 451/356 |
| 2011/0266758 A1 * | 11/2011 | Sergyeyenko | ............ | B24B 23/04 279/106 |
| 2011/0266759 A1 * | 11/2011 | Goldman | ............ | B24B 23/04 279/106 |

* cited by examiner

ACCESSORY CLAMPING MECHANISM AND POWER TOOL HAVING THE SAME

RELATED APPLICATION INFORMATION

This application claims the benefit of CN 201210484176.X, filed on Nov. 23, 2012, CN 201210479970.5, filed on Nov. 23, 2012, CN 201210483883.7, filed on Nov. 23, 2012, and CN 201210483495.9, filed on Nov. 23, 2012 the disclosures of which are incorporated herein by reference in their entirety.

FIELD

The subject disclosure relates to a clamping mechanism, and more particularly to a clamping mechanism for releasably fixing an accessory to a working mandrel. The subject disclosure further relates to a power tool having the clamping mechanism, and more particularly to a power tool having the clamping mechanism for releasably fixing an accessory to a working mandrel.

BACKGROUND

At present, there are various power tools having accessory clamping mechanisms. One of such power tools has an accessory clamping mechanism that comprises a working mandrel for driving the accessory, the accessory being fixed between a holding portion on one end of the working mandrel facing the tool and a fastening member; and a mechanism for moving the fastening member between a released position in which the fastening member is removed from the working mandrel and a clamped position in which the fastening member is clamped against the holding portion by a spring element. The fastening member comprises a clamping shaft inserted into the working mandrel. The clamping shaft is held in the clamped position by a locking assembly arranged in the working mandrel and can be removed in the released position. The locking assembly comprises a collar and clamping members, and the clamping members are radially and movably held in a recess portion of the collar and abut against the collar. Each of the clamping members has an inclining surface at one side facing the tool for mating with the inclining surface of the collar so that the movement of the collar abutting against the inclining surfaces of the clamping members can cause an impact on the clamping member towards the center thereof. The working principle of this power tool lies in that the working mandrel swings around the axis thereof, and the power tool further comprises a housing, a motor arranged in the housing and a main shaft driven by the motor. The main shaft has a rotating axis and an eccentric portion offset from the rotating axis. A coulping fork is driven by the main shaft and is operatively connected to a working unit. The shifting fork has one end pivotally connected to the working mandrel and the other end formed with a pair of branched forks and coupled on the eccentric portion of the main shaft. The working mandrel is generally perpendicular to the rotating axis of the main shaft, and the rotation of the main shaft around the rotating axis is converted into the pivoting motion of the coulping fork along the working mandrel so as to force the working mandrel to move and drive the accessory to work. If the user installs different accessories to the working mandrel, many different operating functions may be obtained. The common accessory may include straight saw blade, circular saw blade, triangle grinding plate or scraper, etc., thereby performing different operations, such as sawing, cutting, grinding or scraping, etc.

However, as for the accessory clamping mechanism of the above power tool, in the releasing process, the user needs to remove the clamping shaft and the accessory simultaneously, and similarly in the clamping process, the user needs to clamp the clamping shaft and the accessory to the working mandrel simultaneously. Thus, this clamping method causes inconvenience in operation. Additionally, once the user loses the clamping shaft incautiously, the accessory clamping mechanism cannot work, and neither can the power tool comprising the accessory clamping mechanism. Moreover, due to the complex structure, the accessory clamping mechanism needs a great number of members and thus the cost is relatively high.

Additionally, there is another power tool having an accessory clamping mechanism, which comprises a body with a motor mounted therein; a clamping assembly having a first clamping member which can move between a closed position in which the clamping assembly holds the accessory and an opened position in which the first clamping member of the clamping assembly is deviated from the accessory so as to remove the accessory from the clamping assembly and the first clamping member is kept to attach to the clamping assembly; and an actuating member having an operating member and movably attached to the body between a first position in which the clamping assembly is in the closed position and a second position in which the movement of the operating member of the actuating member causes the clamping assembly to move to the opened position.

However, when this accessory clamping mechanism is used to clamp an accessory, an end portion of the accessory needs to pass through the working mandrel, thus the end portion of the accessory is provided with an open-ended aperture so as to be clamped and released, but it cannot clamp and release the accessory with a close-ended aperture, and thus the universality of this accessory clamping mechanism is reduced.

SUMMARY

To overcome the defects existing in the prior art, it is necessary to provide an accessory clamping mechanism and a power tool comprising the same, wherein the accessory clamping mechanism has a simple structure without an assistant clamping shaft and has high universality for accessories.

The subject disclosure therefore describes an accessory clamping mechanism for clamping an accessory to a working mandrel having a mandrel flange, the accessory clamping mechanism comprising: a fastening flange; a driving device for forcing the fastening flange to move between a released position in which the accessory can be removed between the mandrel flange and the fastening flange and a clamped position in which the accessory is clamped between the mandrel flange and the fastening flange; a pushing member connected to the fastening flange; and a first elastic member by which the fastening flange is biased towards the clamped position; wherein the pushing member is arranged on one side of the working mandrel. On one hand, the present invention does not need a single clamping shaft to be clamped and released together with the accessory, thereby avoiding the risk of losing the clamping shaft for the user and saving the cost; on the other hand, the present invention can clamp the accessory with a closed end portion, thereby enhancing the universality of the accessory clamping mechanism.

Further, the driving device may comprise an operating assembly and a thrusting member with the operating assembly comprising an operating member moving between a first position in which the thrusting member is disengaged from the pushing member and the fastening flange is in the clamped position and a second position in which the thrusting member forces the fastening flange to the released position. The user can thus operate the accessory clamping mechanism directly by the operating member without an additional tool.

Further, the driving device may also comprise an operating assembly and a restoring assembly with the operating assembly comprising an operating member having an engaged position in which the operating member is engaged with the surface of the housing, and the restoring assembly restoring the operating member automatically to the engaged position. Thus, when the fastening flange is in the clamped position, the operating member is flush with the end portion of the housing so that the user has wider handling portion.

Further, the restoring assembly may comprise a thrusting member having a pushing position in which the thrusting member contacts the pushing member to transmit an acting force to the pushing member and a restoring position in which the thrusting member is disengaged from the pushing member to restore the operating member to the engaged position automatically.

The automatic restoring may be obtained by the following technical solution: the operating assembly may further comprise a second elastic member with two ends mounted to the housing and the operating member respectively with the restoring assembly further comprising a pressing member, a third elastic member with two ends acting on the housing and the thrusting member respectively and a fourth elastic member with two ends mounted to the pressing member and the operating member respectively, and wherein the acting force of the second elastic member is larger than that of the third elastic member, and the acting force of the third elastic member is larger than that of the fourth elastic member.

To facilitate the operation of the user, the operating assembly may further comprise a pivoting shaft around which the operating member pivots, where the thrusting member is arranged between the operating member and the pivoting shaft. The operating member is configured as a lever, thus it can save effort.

Further, the thrusting member and the operating member may be arranged on the same side of the working mandrel so as to make the structure more compact.

Further, the mandrel flange may be provided with a form-fitting structure with the accessory being provided with a corresponding form-fitting structure so that the mandrel flange is connected with the accessory in form-fitting manner so that a torque may be transmitted without relative rotation between the accessory and the mandrel flange.

Further, the fastening flange may be provided with an opening for viewing the relative corresponding positions of the form-fitting structure of the mandrel flange and the corresponding form-fitting structure of the accessory, in order to facilitate the user to fit the form-fitting structure of the accessory with the form-fitting structure of the mandrel flange accurately.

The present invention also provides a power tool comprising the foregoing accessory clamping mechanism, the power tool comprising: a housing; a motor accommodated in the housing and having a driving shaft; a power source for providing power to the motor; and a transmission mechanism for converting the rotating motion of the driving shaft of the motor into the oscillating motion of the working mandrel around the axis thereof. In an oscillating power tool, the accessory clamping mechanism can clamp the accessory more reliably and facilitate the operation.

Further, the transmission mechanism may comprise an eccentric member mounted to the driving shaft and a linkage member having one end connected to the eccentric member and the other end connected to the working mandrel with the pushing member being arranged between the working mandrel and the eccentric member, thus the structure of the power tool is more compact.

DETAILED DESCRIPTION

As shown in FIGS. 1-4, the subject disclosure presents a power tool 1 with an accessory clamping mechanism. Taking an oscillating power tool as an example embodiment, the power tool 1 comprises a housing 2, a power source 3 connected to the housing 2, a motor 4 and a driving shaft 5 accommodated in the housing 2, a transmission mechanism 6, a working mandrel 7 and an accessory clamping mechanism 10.

Figure 1:
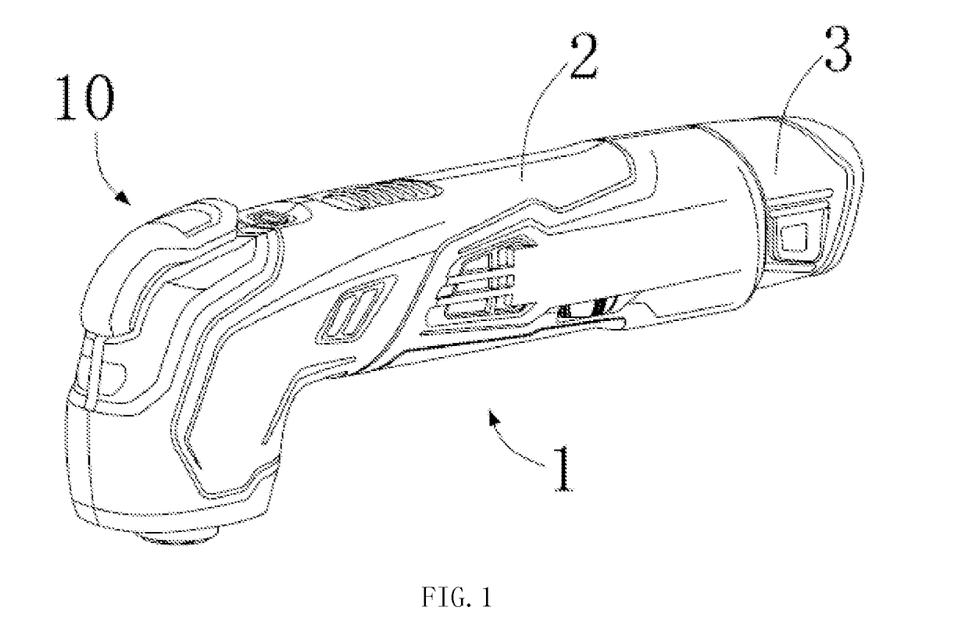
FIG. 1 is a perspective view of an exemplary power tool having an exemplary accessory clamping mechanism constructed according to the description which follows.
Figure 2:
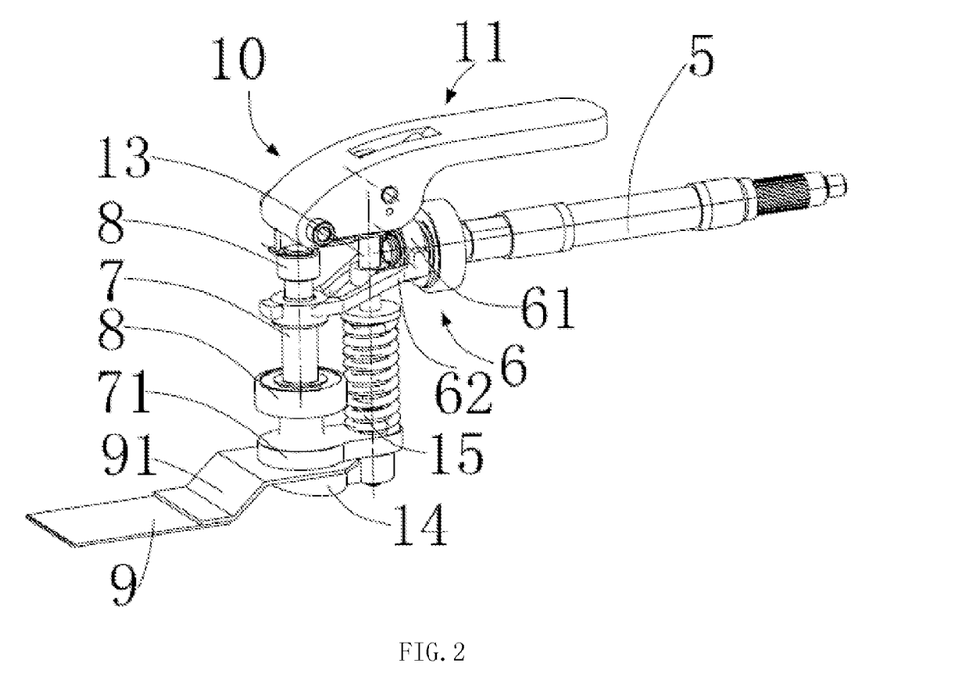
FIG. 2 is a perspective view of the accessory clamping mechanism with the housing removed.

The power source 3 provides power to the motor 4. It may be appreciated that the power source 3 may be any power source well known by the person skilled in the art, such as a battery pack, an AC power source, an air compressor or a mobile power pack. The driving shaft 5 is driven by the motor 4 and can rotate about its rotating axis X. The transmission mechanism 6 comprises an eccentric member 61 and a linkage member 62. The eccentric member 61 has an axis offset from the rotating axis X of the driving shaft 5, and the linkage member 62 is driven by the driving shaft 5 and operatively connected to the working mandrel 7 which is supported by a pair of bearings 8. The linkage member 62 is configured to be a coupling fork. One end of the coupling fork is fixedly connected to the working mandrel 7 and the other end is provided with a pair of branched forks and coupled to the eccentric member 61. The working mandrel 7 has a rotating axis Y that is substantially perpendicular to the rotating axis X of the driving shaft 5. The rotation of the driving shaft 5 around its rotating axis X is converted into the pivoting motion of the linkage member 62 along the rotating axis Y of the working mandrel 7 so as to force the working mandrel 7 to move and drive the accessory 9 to swing. That is to say, the rotation of the motor 4 is converted into the oscillating motion of the working mandrel 7 around its rotating axis Y by the transmission mechanism 6.

The accessory 9 is clamped to a mandrel flange 71 of the working mandrel 7 by the accessory clamping mechanism 10. The connecting relation of the mandrel flange 71 and the accessory 9 is further shown in FIG. 3, the mandrel flange 71 is provided with a form-fitting structure 710 having a plurality of bosses extending along the rotating axis Y of the working mandrel 7. Preferably, the mandrel flange 71 is provided with four bosses. The accessory 9 comprises an end portion 90, a stepped portion 91 and a workpiece processing area 92. The end portion 90 is preferably configured as a close-ended aperture and provided with a corresponding form-fitting structure 93, and the stepped portion 91 has a vertical height. Preferably, the form-fitting structure 93 is provided with eight grooves that each can be connected to one of the bosses in form-fitting manner. The reason that the number of the grooves is larger than that of the bosses is to facilitate the accessory 9 to rotate at various angles relative to the working mandrel 7 so as to meet different situations. It may be appreciated that the bosses of the mandrel flange 71 and the grooves of the accessory 9 may be arranged as needed, for example, the number of the bosses is four and the number of the grooves is twelve and so on, which is well known to the person skilled in the art. Certainly, the end portion 90 may also be configured as an open-ended aperture, which can also be clamped by the accessory clamping mechanism 10. After being clamped by the accessory clamping mechanism 10, the accessory 9 swings together with the working mandrel 7. The oscillating frequency may be arranged to be 10000-25000 times per minute and the oscillating angle may be arranged between about 0.5° and 7°. With high-frequency oscillating motion, the accessory 9 can perform various operations for the workpiece. The user can perform various different operating functions by mounting different accessories to the working mandrel 7. The common accessory 9 may include a straight saw blade, circular saw blade, triangle grinding plate or scraper, etc., thereby performing different operations, such as sawing, cutting, grinding or scraping. It may be appreciated that the person skilled in the art may use other functional accessories depending on the actual working situations.

Further, referring to FIGS. 4-9, the accessory clamping mechanism 10 comprises a driving device, a pushing member 13, a fastening flange 14 and a first elastic member 15. The pushing member 13 is arranged on one side of the working mandrel 7. Furthermore, the pushing member 13 is arranged between the eccentric member 61 and the working mandrel 7. The pushing member 13 has a longitudinal axis Z parallel to the axis Y of the working mandrel. The transmission mechanism 6 is further provided with a supporting portion 63 for supporting and guiding the pushing member 13. The pushing member 13 and the fastening flange 14 are fixedly connected with each other or arranged in one piece. The thickness of the fastening flange 14 is smaller than or equal to the vertical height of the stepped portion 91 of the accessory 9 so as to allow for operation of the accessory 9 in a narrow space. The mandrel flange 71 is provided with a supporting portion for facilitating the pushing member 13 to pass through and supporting the pushing member 13. The mandrel flange 71 has an enlarged portion on one side facing the pushing member 13. The enlarged portion, the fastening flange 14 and the pushing member 13 constitute the balance weight block having a center of gravity on one side of the working mandrel 7, and the center of gravity of the accessory 9 is on the other side of the working mandrel 7.

During the oscillating process, the enlarged portion of the mandrel flange, the fastening flange 14 and the pushing member 13 swing in a direction opposite to the accessory 9 so as to counteract the oscillation caused by the accessory 9, and then the pushing member 13 can transmit the force applied to the driving device by the user to the fastening flange 14. When the end portion 90 of the accessory 9 is configured as a close-ended aperture, the accessory 9 can be clamped between the mandrel flange 71 and the fastening flange 14 without passing through the pushing member 13. The driving device can force the fastening flange 14 to move between a released position and a clamped position. In the released position, the accessory 9 can be removed between the mandrel flange 71 and the fastening flange 14; and in the clamped position, the accessory 9 is clamped between the mandrel flange 71 and the fastening flange 14. Preferably, the first elastic member 15 may be configured as a compression spring with one end arranged on the mandrel flange 71 and the other end arranged on the boss 130 extending radially on the pushing member 13. The boss 130 may be a single circular gasket or a step extending radially and integrated with the pushing member 13. It may be appreciated that the first elastic member 15 may be configured as any other members well known to the person skilled in the art, such as an elastic rubber or leaf spring. The fastening flange 14 is biased towards the clamped position by the first elastic member 15. The force applied to the driving device by the user may be transmitted to the fastening flange 14, and then the fastening flange 14 overcomes the acting force of the first elastic member 15 to move to the released position, thereby removing the accessory 9 between the fastening flange 14 and the mandrel flange 71.

Figure 10:
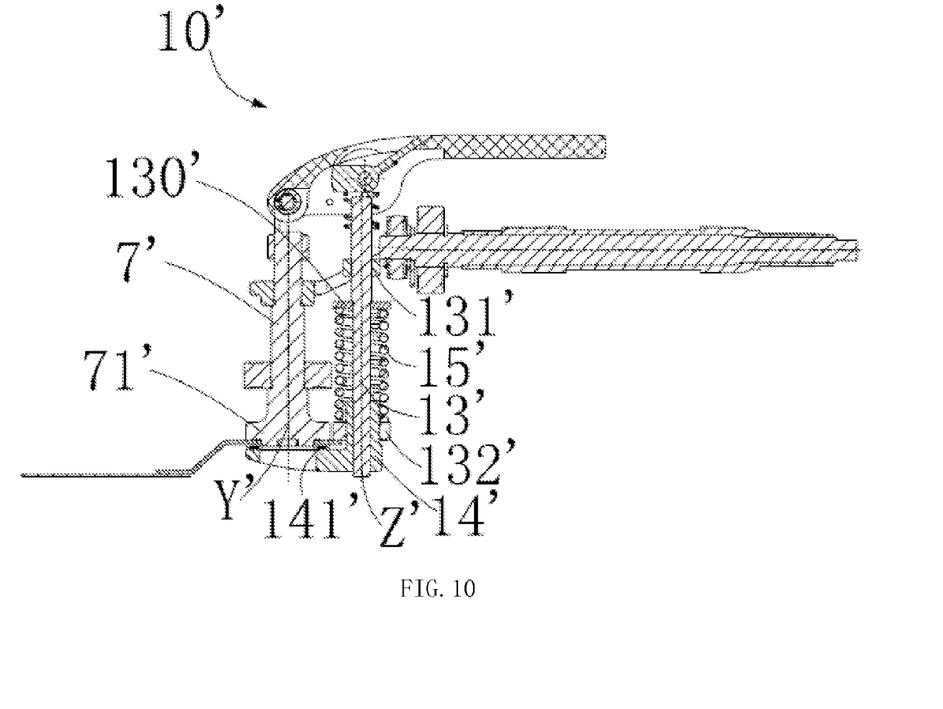
FIG. 10 is a partial sectional view of an exemplary power tool having a further exemplary accessory clamping mechanism constructed according to the description which follows, wherein the housing is removed.

FIG. 10 illustrates a second embodiment of the accessory clamping mechanism 10'. Contrary to the first embodiment, the fastening flange 14' and the pushing member 13' are separated from the mandrel flange 71' so that the pushing member 13' and the fastening flange 14' do not swing with the working mandrel 7'. Specifically, the mandrel flange 71' does not have an enlarged portion and is arranged symmetrically about the rotating axis Y'. The pushing member 13' is supported and guided by a first supporting portion 131' and a second supporting portion 132' arranged on the housing. One end of the elastic member 15' is arranged on the boss 130' of the pushing member 13' and the other end is arranged on the second supporting portion 132'. The fastening flange 14' is provided with a plane bearing 141'. The plane bearing 141' has a rolling pin which can rotate in the oscillating process of the accessory, but the end plate of the plane bearing 141' and the fastening flange 14' do not swing with the accessory and the working mandrel 7'. With such arrangement, the friction between the working mandrel 7' and the accessory may be reduced.

Next, the structure of the driving device of the accessory clamping mechanism 10 according to the first embodiment will be explained in details.

Referring to FIGS. 4-9 again, the driving device comprises an operating assembly 11 and a restoring assembly 12.

The operating assembly 11 comprises a pivoting shaft 110, a second elastic member 111 and an operating member 112. The pivoting shaft 110 is mounted to the housing 2. Preferably, the second elastic member 111 may be configured as a torsion spring mounted to the pivoting shaft 110. The torsion spring has one end arranged on the housing 2 and the other end arranged on the operating member 112. The operating member 112 is biased towards the direction close to the housing 2 by the second elastic member 111. It may be appreciated that the second elastic member 111 may be configured as any other members well known to the person skilled in the art, such as elastic rubber or leaf spring. Preferably, the operating member 112 may be configured as a spanner pivoting around the pivoting shaft 110. The axis of the pivoting shaft 110 is perpendicular to the axis Y of the working mandrel 7. As well known to the person skilled in the art, the operating member 112 may also be configured as any other structures for facilitating the operation, such as a pushing button or pressing button. The restoring assembly 12 comprises a pivoting shaft 120, a thrusting member 121, a pressing member 122, a third elastic member 123 and a fourth elastic member 124. The pivoting shaft 120 is mounted to the operating member 112, and the thrusting member 121 and the pressing member 122 are arranged on the two sides of the pivoting shaft 120 respectively. The thrusting member 121 is arranged between the operating member 112 and the pivoting shaft 110, and the thrusting member 121 and the operating member 112 are arranged on the same side of the working mandrel 7. One end of the third elastic member 123 is mounted to the housing 2 and the other end may act on the thrusting member 121. Preferably, the third elastic member 123 may be configured as a compression spring. The thrusting member 121 is biased towards the direction away from the pushing member 13 by the third elastic member 123. It may be appreciated that the third elastic member 123 may also be configured as any other members well known to the person skilled in the art, such as an elastic rubber or leaf spring. The fourth elastic member 124 is mounted to the pivoting shaft 120 with two ends arranged on the operating assembly 11 and the pressing member 122 respectively. Preferably, the fourth elastic member 124 is configured as a torsion spring. The thrusting member 121 is biased towards the direction of mating with the pushing member 13 by the fourth elastic member 124. It may be appreciated that the fourth elastic member 124 may also be configured as any other members well known to the person skilled in the art, such as an elastic rubber or leaf spring. The driving device may only comprise the operating assembly 11 and the thrusting member 121, and other members in the restoring assembly 12 are omitted. With such arrangement, the operating assembly 11 only comprises the operating member 112 to move between a first position and a second position. In the first position, the thrusting member 121 is disengaged from the pushing member 13, and the fastening flange 14 is in the clamped position; and in the second position, the thrusting member 121 forces the fastening flange 14 to the released position.

Next, the operating process of the accessory clamping mechanism 10 of the first embodiment will be explained in details.

Figure 4:
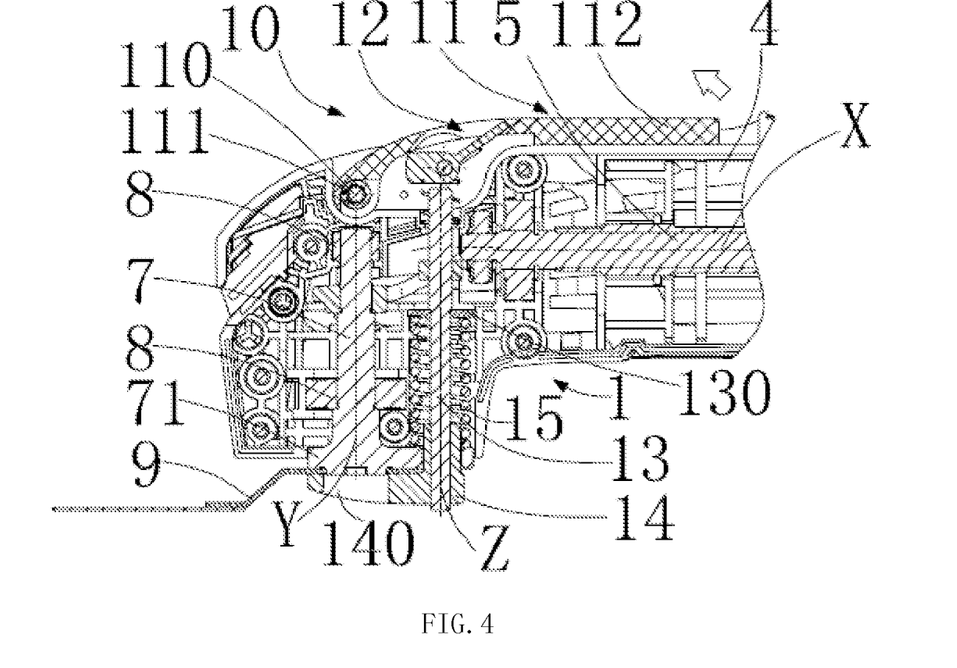
FIG. 4 is a partial sectional view of the operating member of the accessory clamping mechanism of FIG. 1 in the engaged position.
Figure 5:
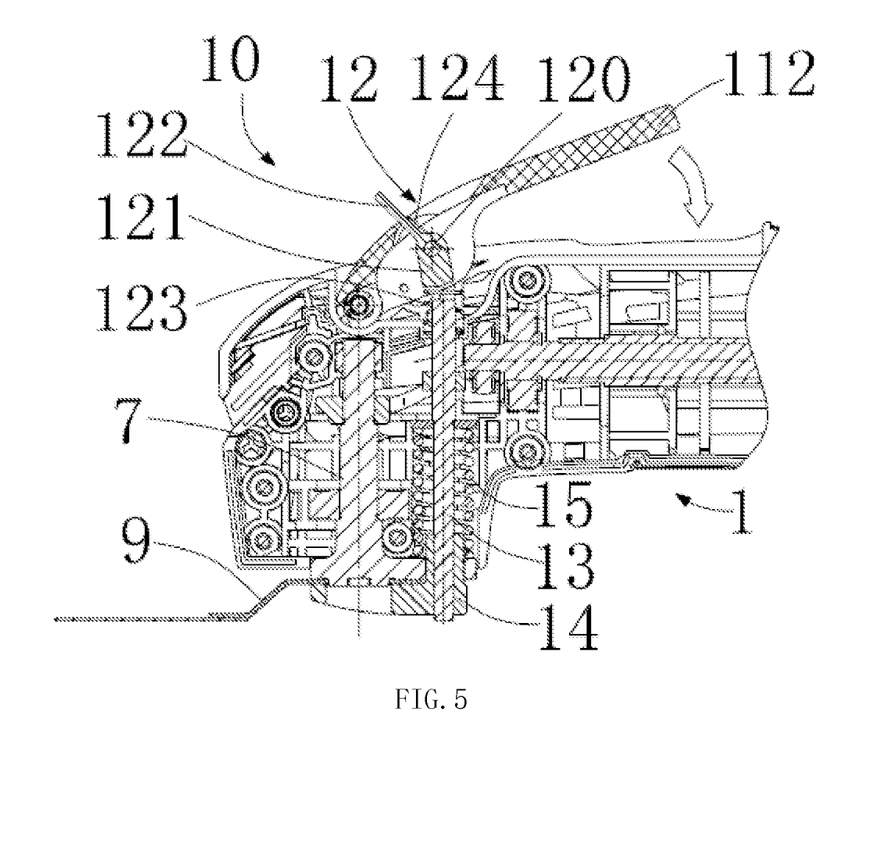
FIG. 5 is a partial sectional view of the operating member of the accessory clamping mechanism of FIG. 1 in the first position.
Figure 6:
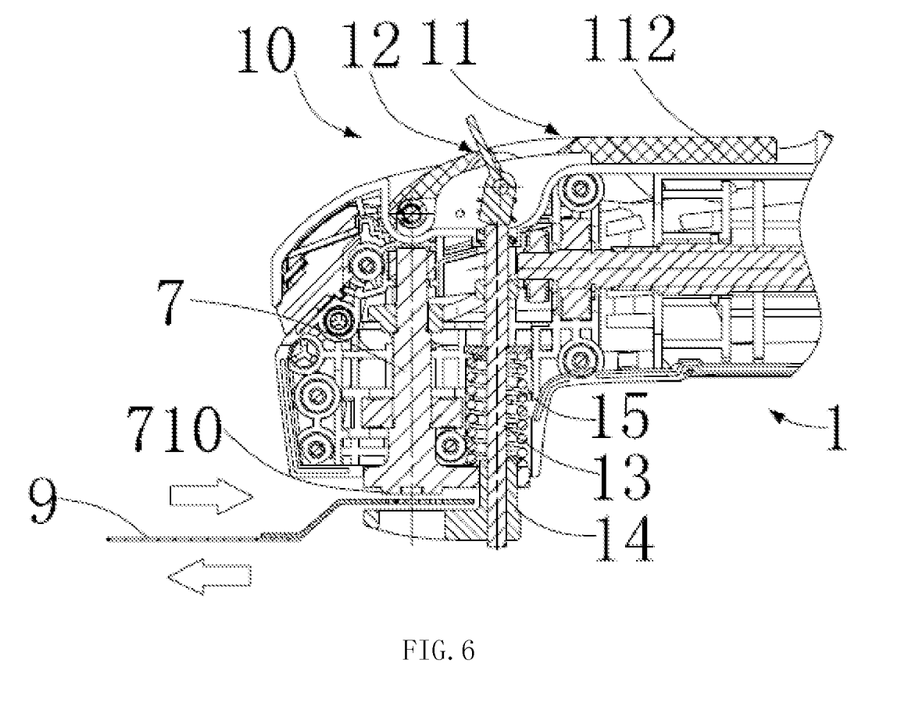
FIG. 6 is a partial sectional view of the operating member of the accessory clamping mechanism of FIG. 1 in the second position.

The operating member 112 may be positioned in the engaged position, the first position and the second position. The operating member 112 can be moved among the engaged position, the first position and the second position. In the engaged position, the thrusting member 121 is disengaged from the pushing member 13 so that the operating member 112 can engage with the surface of the housing, and as shown in FIG. 4, the accessory 9 is still clamped between the fastening flange 14 and the mandrel flange 71. The bottom surface of the operating member 112 may be engaged with a portion of the housing, and the top surface of the operating member 112 is flush with the handle portion of the housing so as to provide a wider handle portion for the user in the operating state. In the first position, the fastening flange 14 is restored to the clamped position under the acting force of the first elastic member 15, and as shown in FIG. 5, the accessory 9 is clamped between the fastening flange 14 and the mandrel flange 71, but the operating member 112 is neither engaged with the surface of the housing nor flush with the handle portion of the housing, thus the user can only handle the portion except the place where the operating member 112 is arranged. In the second position, the thrusting member 121 forces the fastening flange 14 to the released position, and as shown in FIG. 6, the accessory 9 can be removed between the fastening flange 14 and the mandrel flange 71.

The thrusting member 121 of the restoring assembly 12 has a pushing position and a restoring position. In the pushing position, the thrusting member 121 contacts the pushing member 13 so as to transmit the acting force applied to the operating member 112 by the user to the pushing member 13. In the restoring position, the thrusting member 121 is disengaged from the pushing member 13 so as to restore the operating member 112 to the engaged position automatically.

Figure 7:
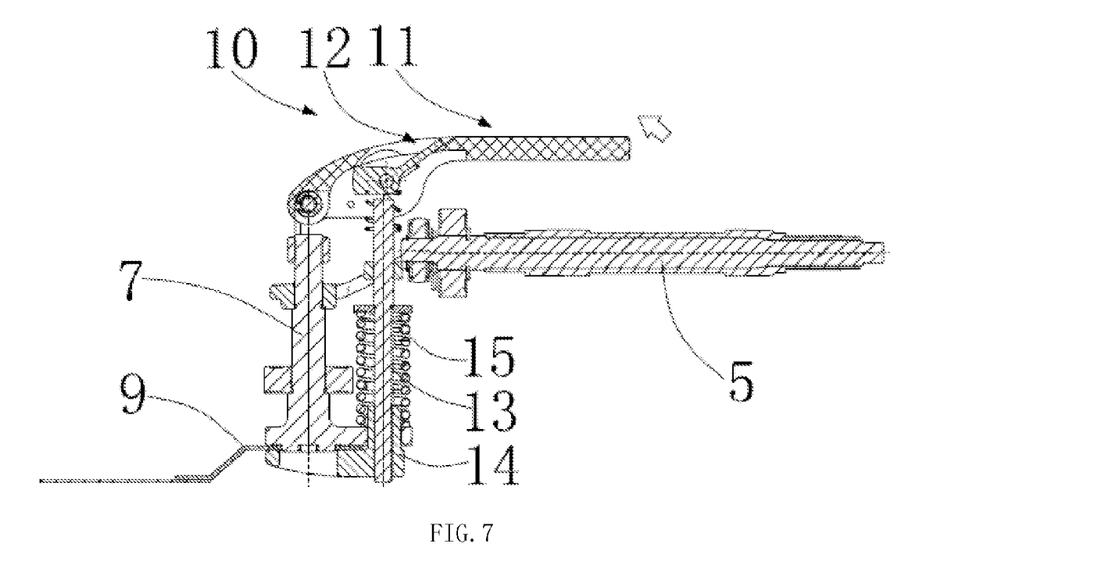
FIG. 7 is a sectional view of the accessory clamping mechanism of FIG. 4 with the housing removed.
Figure 8:
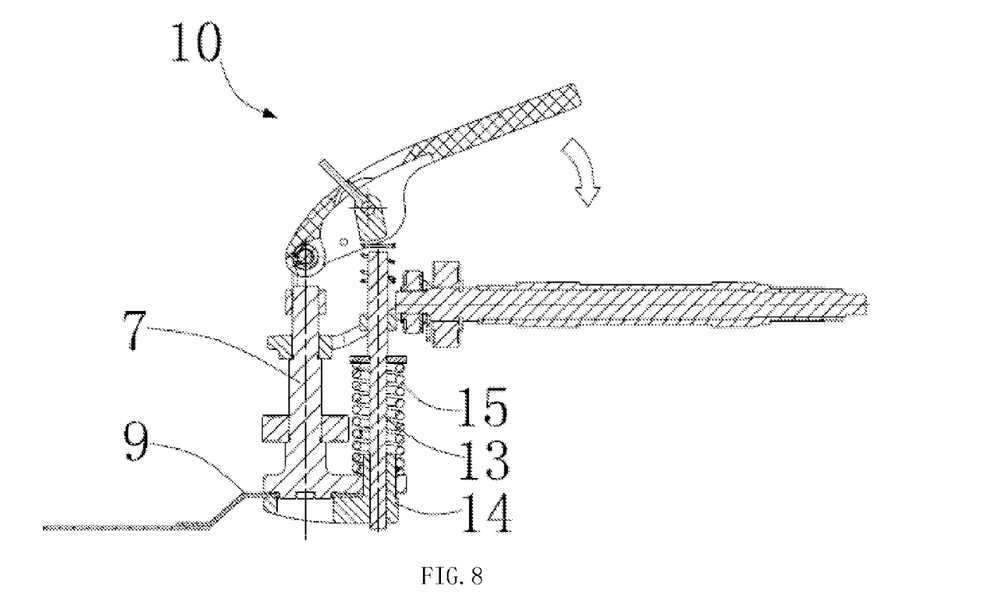
FIG. 8 is a sectional view of the accessory clamping mechanism of FIG. 5 with the housing removed.
Figure 9:
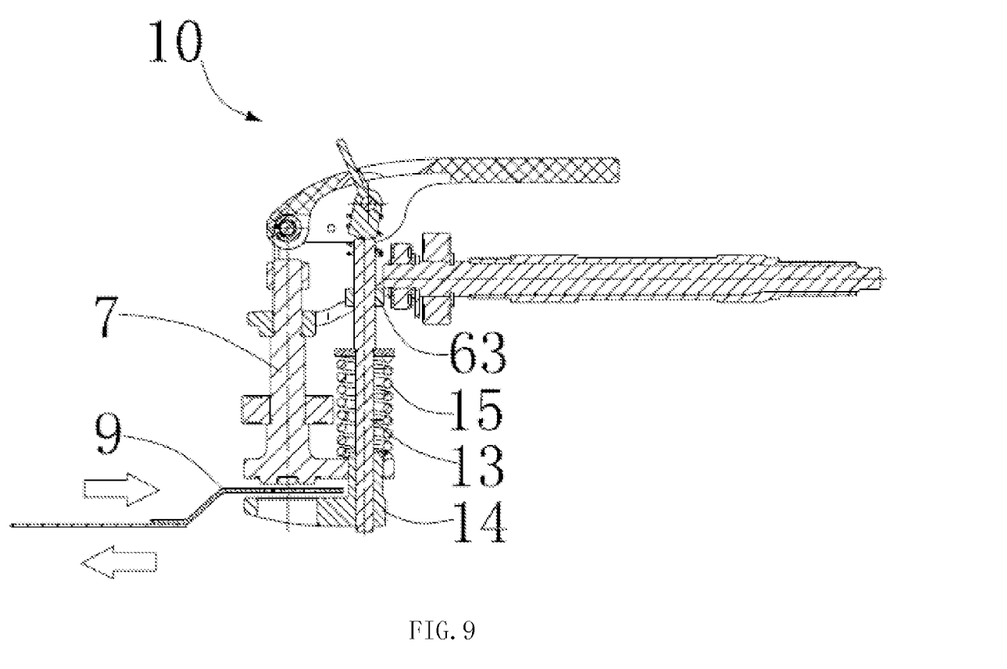
FIG. 9 is a sectional view of the accessory clamping mechanism of FIG. 6 with the housing removed.

The operating member 112 is moved along the direction of the arrow as indicated in FIGS. 4 and 7 from the engaged position to the first position as shown in FIGS. 5 and 8, and the thrusting member 121 of the restoring assembly 12 is biased to the pushing position under the action of the fourth elastic member 124. Then, the operating member 112 is moved along the direction of the arrow as indicated in FIGS. 4 and 7 from the first position to the second position as shown in FIGS. 6 and 9, and the thrusting member 121 transmits the acting force applied to the operating member 112 by the user to the pushing member 13 and overcomes the acting force of the first elastic member 15 to move the pushing member 13 and the fastening flange 14 downwards, then the fastening flange 14 is disengaged from the surface of the accessory 9 and leaves enough space to remove the accessory 9 between the fastening flange 14 and the mandrel flange 71 along the direction of the removing arrow as indicated in FIGS. 6 and 9. Once the user puts the accessory 9 between the fastening flange 14 and the mandrel flange 71 again along the direction of the putting arrow as indicated in FIGS. 6 and 9, the operating member 112 is released so that the pushing member 13 and the fastening flange 14 are restored to the clamped position under the action of the first elastic member 15. At this moment, the operating position for the user is in the first position as shown in FIGS. 4 and 7, and the user operates the pressing member 122 in the restoring assembly 12 to move the thrusting member 121 from the pushing position to the restoring position so that the operating member is restored to the engaged position automatically. In order to ensure this process to be carried out effectively, it needs to be arranged such that the acting force of the second elastic member 111 is larger than that of the third elastic member 123, and the acting force of the third elastic member 123 is larger than that of the fourth elastic member 124. When the thrusting member 121 is moved from the pushing position to the restoring position, since the acting force of the third elastic member 123 is larger than that of the fourth elastic member 124, the thrusting member 121 can not be restored to the biased position automatically, but biased to the restoring position under this acting force. Once the thrusting member 121 is disengaged from the pushing member 13, since the acting force of the second elastic member 111 is larger than that of the third elastic member 123, the operating member 112 is biased to the engaged position automatically. It may be appreciated that the directions of the putting and removing arrows are the lateral directions of the working mandrel 7. Preferably, these directions may be arranged to be perpendicular to the rotating axis Y of the working mandrel 7.

Figure 3:
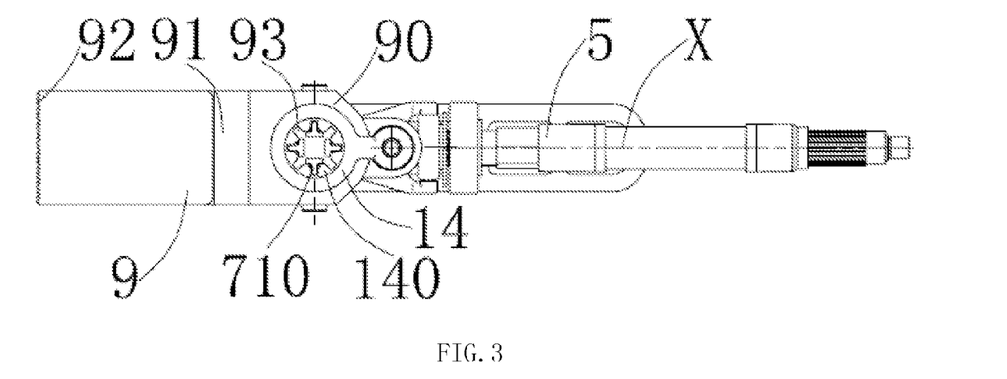
FIG. 3 is a bottom view of the accessory clamping mechanism of FIG. 2

FIGS. 3 and 4 further illustrate that the fastening flange 14 is provided with an opening 140. During the operation for clamping the accessory 9, the user can exactly view the relative corresponding position of the form-fitting structure 710 of the mandrel flange 71 and the corresponding form-fitting structure 93 of the accessory 9, thereby enabling the user to clamp the accessory 9 between the fastening flange 14 and the mandrel flange 71 quickly and accurately.

It may be appreciated that the accessory clamping mechanism 10 may not only be used in oscillating power tools, but also in other manual tools, or power tools such as an angle grinder or an electric circular saw. When used in a manual tool, the accessory clamping mechanism 10 may comprise a housing 2; a working mandrel 7 for driving a accessory 9 clamped between a mandrel flange 71 and a fastening flange 14; a driving device for forcing the fastening flange 14 to move between a released position in which the accessory 9 can be removed between the mandrel flange 71 and the fastening flange 14 and a clamped position in which the accessory 9 is clamped between the mandrel flange 71 and the fastening flange 14; a pushing member 13 connected to the fastening flange; and a first elastic member 15 by which the fastening flange 14 is biased towards the clamped position. In this way, the accessory clamping mechanism 10 may be used in manual tools. As well known to the person skilled in the art, as long as the transmission mechanism in the oscillating power tool is replaced by other transmission mechanisms as needed by other power tools, and the accessory can machine the workpiece under the action of the corresponding transmission mechanism, and then the accessory clamping mechanism can be used in other power tools.

The accessory clamping mechanism and the power tool comprising the accessory clamping mechanism disclosed by the present invention are not limited to the contents in the above embodiments and the structures indicated by the drawings. The obvious changes, substitutions and modifications to the shapes and positions of the members based on the present invention are contained in the protection scope of the present invention.

What is claimed is:

1. An accessory clamping mechanism for clamping an accessory to a working mandrel having a mandrel flange, the accessory clamping mechanism comprising:
   a fastening flange;
   a driving device for forcing the fastening flange to move between a released position in which the accessory can be removed between the mandrel flange and the fastening flange and a clamped position in which the accessory is clamped between the mandrel flange and the fastening flange;
   a pushing member connected to the fastening flange and transmitting a force applied to the driving device by a user to the fastening flange; and
   a first elastic member by which the fastening flange is biased towards the clamped position;
   wherein the pushing member is arranged on one side of the working mandrel, and the pushing member has a longitudinal axis offset from and parallel to a rotation axis of the working mandrel.

2. The accessory clamping mechanism according to claim 1, wherein the driving device comprises an operating assembly and a thrusting member, and the operating assembly moves an operating member between a first position in which the thrusting member is disengaged from the pushing member and the fastening flange is in the clamped position and a second position in which the thrusting member forces the fastening flange to the released position.

3. The accessory clamping mechanism according to claim 2, wherein the operating assembly further comprises a pivoting shaft around which the operating member pivots, and the thrusting member is arranged between the operating member and the pivoting shaft.

4. The accessory clamping mechanism according to claim 2, wherein the thrusting member and the operating member are arranged on the same side of the working mandrel.

5. The accessory clamping mechanism according to claim 1, wherein the accessory clamping mechanism further comprises a housing, and the driving device comprises an operating assembly and a restoring assembly, the operating assembly comprising an operating member having an engaged position in which the operating member is engaged with the surface of the housing, and the restoring assembly restoring the operating member automatically to the engaged position.

6. The accessory clamping mechanism according to claim 5, wherein the restoring assembly comprises a thrusting member having a pushing position in which the thrusting member contacts the pushing member to transmit an acting force to the pushing member and a restoring position in which the thrusting member is disengaged from the pushing member to restore the operating member to the engaged position automatically.

7. The accessory clamping mechanism according to claim 6, wherein the operating assembly further comprises a second elastic member with two ends mounted to the housing and the operating member respectively, and the restoring assembly further comprises a pressing member, a third elastic member with two ends acting on the housing and the thrusting member respectively and a fourth elastic member with two ends mounted to the pressing member and the operating member respectively, wherein the acting force of the second elastic member is larger than that of the third elastic member, and the acting force of the third elastic member is larger than that of the fourth elastic member.

8. The accessory clamping mechanism according to claim 1, wherein the mandrel flange is provided with a form-fitting structure and the accessory is provided with a corresponding form-fitting structure so that the mandrel flange is connected with the accessory in form-fitting manner.

9. The accessory clamping mechanism according to claim 8, wherein the fastening flange is provided with an opening for viewing the relative corresponding position of the form-fitting structure of the mandrel flange and the corresponding form-fitting structure of the accessory.

10. A power tool, comprising:
    a housing;
    a motor accommodated in the housing and having a driving shaft;
    a power source for providing power to the motor; and
    a transmission mechanism for converting the rotating motion of the driving shaft of the motor into the oscillating motion of the working mandrel around the axis thereof; and an accessory clamping mechanism for clamping an accessory to a working mandrel having a mandrel flange wherein the accessory clamping mechanism comprises:

a fastening flange;

a driving device for forcing the fastening flange to move between a released position in which the accessory can be removed between the mandrel flange and the fastening flange and a clamped position in which the accessory is clamped between the mandrel flange and the fastening flange;

a pushing member connected to the fastening flange and transmitting the force applied to the driving device by a user to the fastening flange; and a first elastic member by which the fastening flange is biased towards the clamped position;

wherein the pushing member is arranged on one side of the working mandrel, and the pushing member has a longitudinal axis offset and parallel to a rotation axis of the working madrel.

11. The power tool according to claim 10, wherein the transmission mechanism comprises an eccentric member mounted to the driving shaft and a linkage member having one end connected to the eccentric member and the other end connected to the working mandrel.

12. The power tool according to claim 11, wherein the pushing member is arranged between the working mandrel and the eccentric member.

* * * * *